(12) United States Patent
Johnston

(10) Patent No.: US 8,006,996 B1
(45) Date of Patent: Aug. 30, 2011

(54) COLLAPSIBLE WORK CART

(76) Inventor: Mark Johnston, Hudson, NH (US)

( * ) Notice: Subject to any disclaimer, the term of this patent is extended or adjusted under 35 U.S.C. 154(b) by 297 days.

(21) Appl. No.: 12/355,505

(22) Filed: Jan. 16, 2009

Related U.S. Application Data

(60) Provisional application No. 61/022,021, filed on Jan. 18, 2008.

(51) Int. Cl.
*B62B 1/12* (2006.01)
(52) U.S. Cl. .................................. 280/651; 280/79.5
(58) Field of Classification Search ............. 280/47.38, 280/79.5, 79.6, 33.998, 651; 220/157, 157.1, 220/4.26, 4.27, 475, 495.02
See application file for complete search history.

(56) References Cited

U.S. PATENT DOCUMENTS

| | | | | |
|---|---|---|---|---|
| 3,734,527 A | * | 5/1973 | Bard | 280/79.5 |
| 3,834,725 A | * | 9/1974 | Luoni | 280/79.2 |
| 5,472,220 A | * | 12/1995 | Stephan | 280/79.5 |
| 6,315,310 B1 | * | 11/2001 | Hurt | 280/79.5 |
| 6,419,246 B1 | | 7/2002 | Neal | |
| 6,431,319 B1 | | 8/2002 | Myers et al. | |
| 6,454,281 B1 | * | 9/2002 | Pearson | 280/47.26 |
| 6,688,634 B2 | | 2/2004 | Noffsinger | |
| 6,715,627 B1 | * | 4/2004 | Bonner et al. | 220/4.27 |
| 6,851,566 B1 | * | 2/2005 | Bonner | 220/4.27 |
| 6,935,644 B1 | * | 8/2005 | Oranday | 280/47.34 |

* cited by examiner

*Primary Examiner* — Hau V Phan
*Assistant Examiner* — Bridget Avery
(74) *Attorney, Agent, or Firm* — QuickPatents, Inc.; Kevin Prince

(57) ABSTRACT

A collapsible utility cart for holding working materials, such as a five-gallon drywall mud bucket and related drywall tools, is disclosed. The utility cart is expandable from a collapsed configuration to an extended configuration. A base has a plurality of legs that extend downwardly therefrom, each including a rolling means. A plurality of nestable, generally planer shelves each have a central aperture therein and a retaining lip extending upwardly therefrom at least partially around a perimeter thereof. A bucket holder is adapted to hold the five-gallon bucket and has a peripheral wall extending upwardly around a perimeter thereof. A plurality of support poles each have the interlocking means at each end thereof. A handle is included and adapted to interlock with the interlocking means of the top-most support pole, such that the utility cart may be carried thereby, whether the utility cart is in the extended configuration or the collapsed configuration.

7 Claims, 3 Drawing Sheets

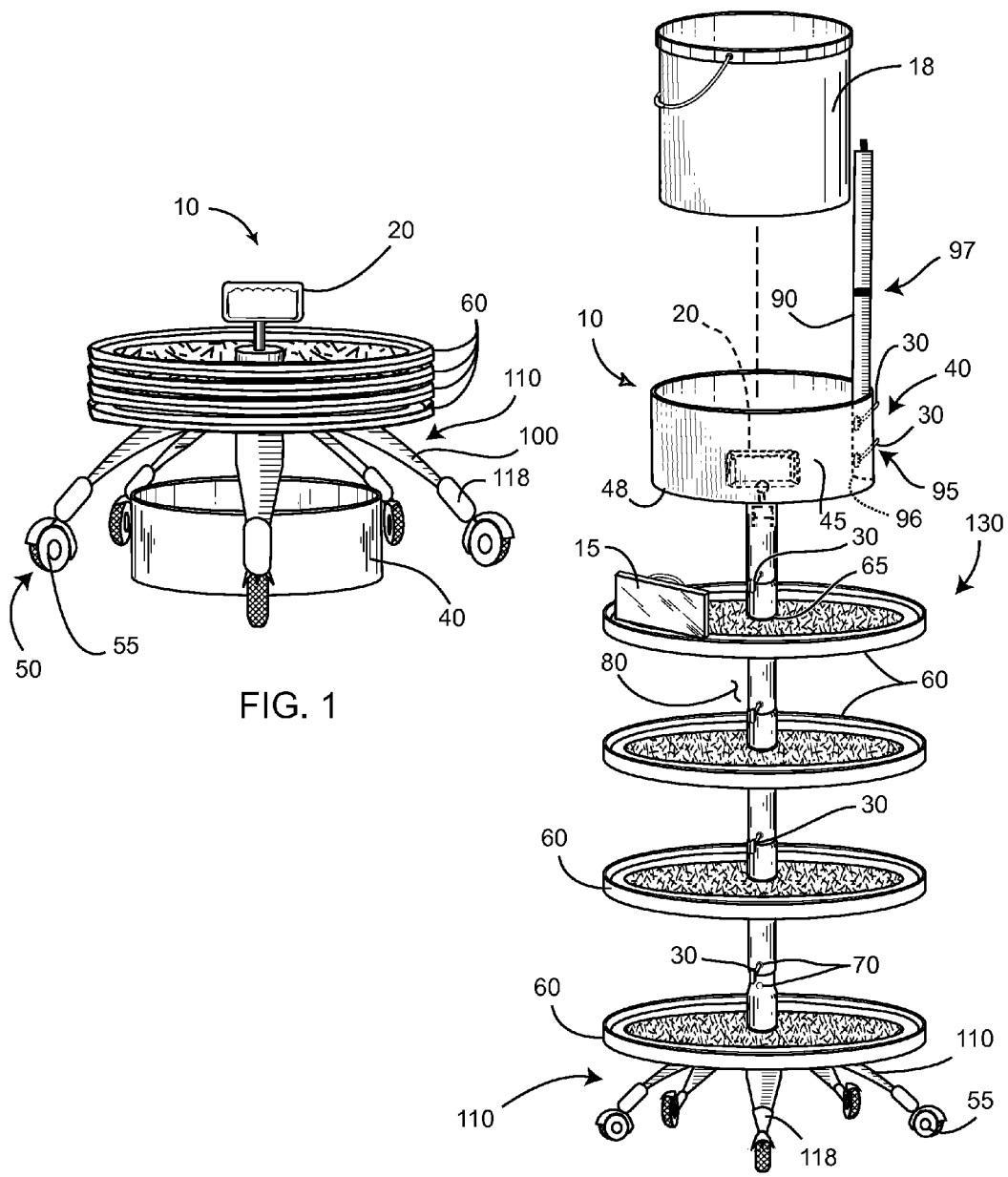

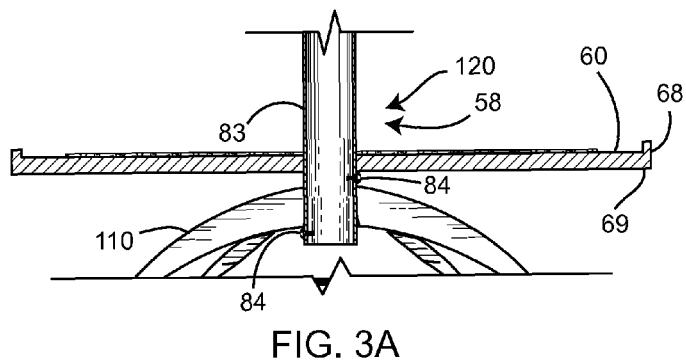
FIG. 3A
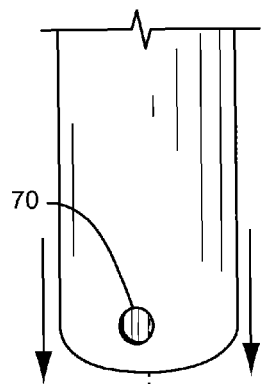
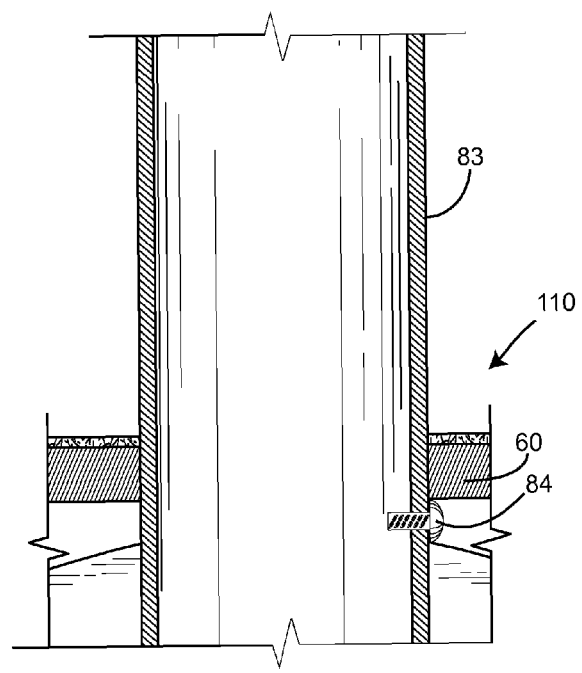
FIG. 3B
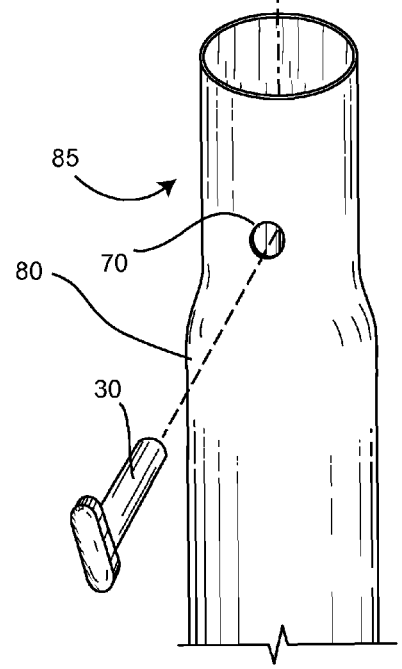
FIG. 4

COLLAPSIBLE WORK CART

CROSS-REFERENCE TO RELATED APPLICATIONS

This application claims the benefit of U.S. Provisional Patent Application 61/022,021, filed on Jan. 18, 2008, and incorporated herein by reference.

STATEMENT REGARDING FEDERALLY SPONSORED RESEARCH AND DEVELOPMENT

Not Applicable.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

FIELD OF THE INVENTION

This invention relates to work carts, and more particularly to a collapsible work cart.

DISCUSSION OF RELATED ART

Building construction contractors, and in particular drywall contractors, often need to have a variety of tools at hand to quickly and properly perform their job. When finishing drywall, often the drywall panels being worked on are overhead, rendering conventional utility carts and tool bags that are resting on a floor surface out of immediate reach.

Typical tool belts, on the other hand, are not large enough to practically hold the variety of tools and implements needed for drywall work. Further, it is often desirable to have a standard five-gallon bucket full of drywall close at hand as well, but tool belts cannot practically hold such a heavy and bulky item.

Several prior art devices aim to solve some of these problems. For example, U.S. Pat. No. 6,419,246 to Neal on Jul. 16, 2002 teaches a bucket dolly that allows a user to more easily cart around a bucket containing paint or other substances. However, such a device does not allow for adjusting the height of the bucket, nor does it provide for convenient close-by storage of tools.

U.S. Pat. No. 6,688,634 to Noffsinger on Feb. 10, 2004 teaches a height-adjustable tool cart that collapses down to a compact size for storage and transport. Such a device, however, is not well-suited for holding drywall finishing tools or securely holding a relatively heavy bucket of drywall finishing compound. Further, such a device can only achieve a limited height and is not selectively expandable up to any height, even that of several times higher than its base height. U.S. Pat. No. 6,431,319 to Myers et al. on Aug. 13, 2002 suffers from the same drawbacks.

Therefore, there is a need for a device that is adapted for holding a relatively heavy bucket of drywall finishing compound. Such a needed device would be selectively adjustable to just about any height required by the job at hand. Further, such a device would be able to hold a variety of sizes and shapes of drywall finishing tools conveniently within reach of the contractor. The needed device would also be readily rollable on a floor surface as needed by the contractor without the contractor having to come down from a ladder or remove stilts, etc. The present invention accomplishes these objectives.

SUMMARY OF THE INVENTION

The present device is a collapsible utility cart for holding working materials, such as a five-gallon drywall mud bucket and related drywall tools. The utility cart is expandable from a collapsed configuration to an extended configuration. A base has a plurality of legs that extend downwardly therefrom. A distal end of each leg includes a rolling means.

A plurality of support poles are included, each having an interlocking means at each end thereof. As such, any two of the support poles may be locked together by their respective interlocking means. An upper side of the base includes an interlocking means. Preferably a pivotably handle is included and adapted to interlock with the interlocking means of the top-most support pole, such that the utility cart may be carried thereby, whether the utility cart is in the extended configuration or the collapsed configuration.

Further, a bucket holder is adapted to hold the five-gallon bucket and has a peripheral wall extending upwardly around a perimeter thereof. The bucket holder is adapted to be centered above, and mounted to, the top-most support pole. A plurality of nestable, generally planer shelves may also be included, each having a central aperture therein and a retaining lip extending upwardly therefrom at least partially around a perimeter thereof.

In use, each shelf and support pole may be alternately added to the base to achieve the extended configuration of the utility cart. Each shelf and all but one of the support poles may then be removed from the base, the shelves each nesting together on the one support pole. The handle may then be fixed to the top end of the one support pole to achieve the collapsed configuration of the utility cart. In the collapsed configuration, the uppermost shelf is adapted to retain each of the support poles therein.

The present invention is a device that is adapted for holding a relatively heavy bucket of drywall finishing compound at any desired height required by user. Further, the present invention holds a variety of sizes and shapes of drywall finishing tools conveniently within reach of the user, and is readily rollable on a floor surface as needed without the user having to come down from a ladder or remove stilts, etc., and is able to be lifted off of the ground by its handle even when in the expanded configuration. The present invention conveniently collapses into a compact configuration to facility travel and storage thereof. The present device is further expandable to hold utility lighting as desired by the user. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1 is a perspective view of the invention, illustrated in an extended configuration;

FIG. 2 is a perspective view of the invention, illustrated in a collapsed configuration;

FIG. 3A is a cross-sectional view of a base of the invention;

FIG. 3B is an enlarged cross-sectional view of the base of FIG. 3A;

FIG. 4 is an exploded perspective view of one embodiment of a support pole interlocking means.

DETAILED DESCRIPTION OF THE PREFERRED EMBODIMENT

Figure 5:
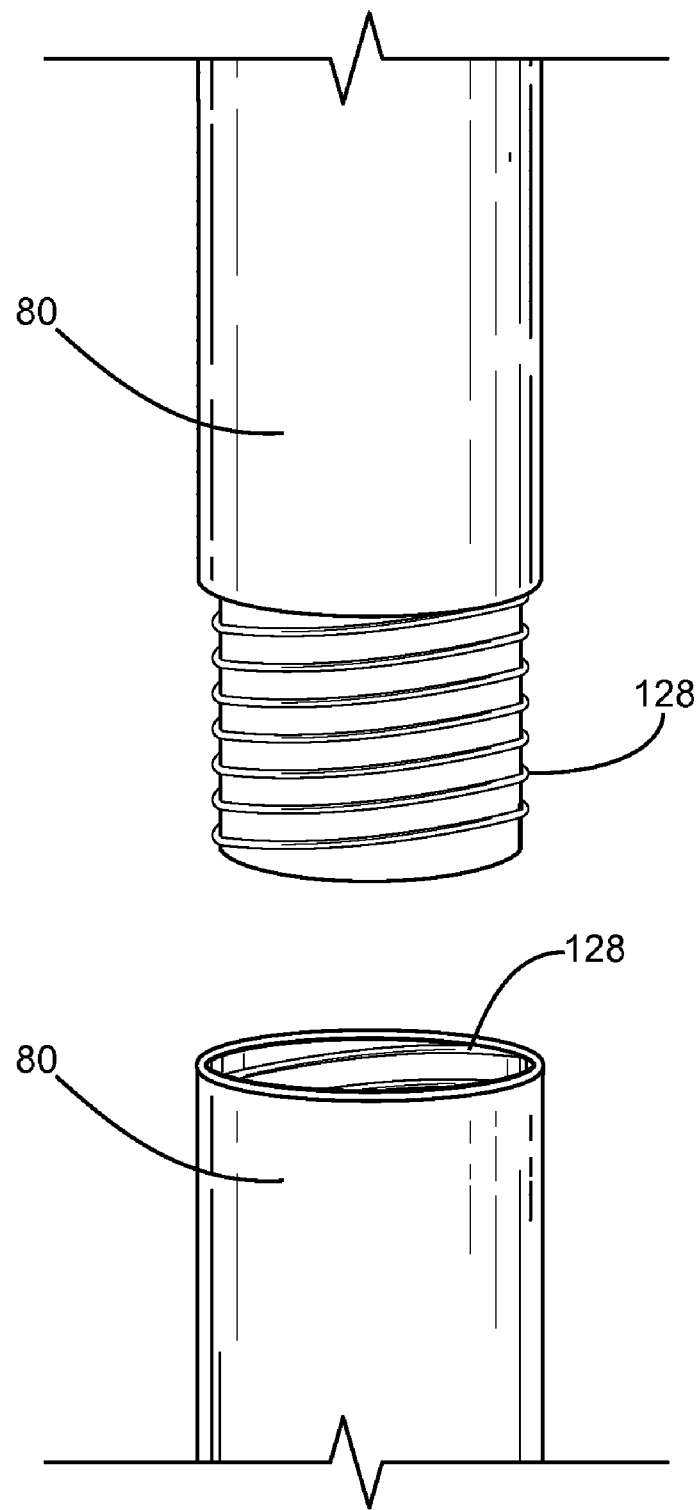
FIG. 5 is an exploded perspective view on an alternate embodiment of the interlocking means.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

FIGS. 1 and 2 illustrate a collapsible utility cart 10 for holding working materials 15, such as a five-gallon drywall mud bucket 15 and related drywall tools, electrician's tools, or the like. The utility cart 10 is expandable from a collapsed configuration 140 (FIG. 1) to an extended configuration 130 (FIG. 2).

A base 100 has a plurality of legs 110 that extend downwardly therefrom. A distal end 118 of each leg 110 includes a rolling means 50, such as a caster 55. Alternately, a low-friction sliding pad (not shown) may be used as the rolling means 50.

A plurality of support poles 80 are included, each having an interlocking means 120 at each end 85 thereof. As such, any two of the support poles 80 may be locked together by their respective interlocking means 120 (FIG. 4). An upper side 58 of the base 100 includes the interlocking means 120, which may include at least one locking pin 30 adapted to traverse aligned pin apertures 70 of two interlocking support poles 80 (FIG. 4), or a cooperative screw thread 128 (FIG. 5). In one embodiment, one end 87 of each support pole 80 is open and of a larger diameter than the other end 88 of each other support pole 80, such that each support pole 80 may be interlocked with any other support pole 80. The base 100 preferably includes one of the support poles 80 fixed thereto (FIGS. 3A and 3B). Each support pole 80 is preferably made of a light-weight tube stock, such as metal or plastic tubing, such as aluminum tubing.

A bucket holder 40 is adapted to hold the five-gallon bucket 15 and has a peripheral wall 45 extending upwardly around a perimeter 48 thereof. The bucket holder 40 is adapted to be secured centrally, such as through a central aperture 65 therein, to the top-most support pole 80. Preferably, a plurality of nestable, generally planer shelves 60 are included, each having the central aperture 65 therein and a retaining lip 68 extending upwardly therefrom at least partially around a perimeter 69 thereof (FIG. 3). Each shelf 60 and the bucket holder 40 is preferably made from a rigid yet light-weight material, such as plastic or, preferably, aluminum.

Further, the utility cart 10 preferably also includes a rigid light pole 90 adapted for mounting to the bucket holder 40 at a light pole mounting means 95 adapted to secure a bottom end 96 of the light pole 90 thereto, such as with the locking pins 30 and apertures 70, or other suitable pole mounting means 95. The light pole 90 preferably includes extending means 97, such as multiple segments and threaded ends (not shown) for is selectively adjusting the height of the light pole 90.

Preferably a handle 20 is included and adapted to interlock with the interlocking means 120 of the top-most support pole 80, such that the utility cart 10 may be carried thereby, whether the utility cart 10 is in the extended configuration 130 or the collapsed configuration 140. The handle 20 may slide over the top end 87 of any of the support poles 80 and be secured thereto by one of the locking pins 30, for example. Alternately, the handle 20 may have cooperating screw threads 128. Further, the handle 20 is adapted to be selectively folded down flat against the bucket holder 40.

In use, each shelf 60 and support pole 80 may be alternately added to the base 100 to achieve the extended configuration 130 of the utility cart 10. Each shelf 60 and all but one 83 of the support poles 80 may then be removed from the base 100, the shelves 60 each nesting together on the one support pole 83. The handle 20 may then be fixed to the top end 85 of the one support pole 83 to achieve the collapsed configuration 140 of the utility cart 10. In the collapsed configuration, the uppermost shelf 60 is adapted to retain each of the support poles 80 therein. The bucket holder 40 may be fixed to an underside of the base 100 with a locking pin, a screw thread arrangement, straps, or the like (not shown).

While a particular form of the invention has been illustrated and described, it will be apparent that various modifications can be made without departing from the spirit and scope of the invention. For example, as illustrated each shelf 60 is round in plan view. However, each shelf 60 could easily be made rectangular or oval in plan view (not shown). Likewise, the interlocking means 120 has been shown as a pin-and-aperture arrangement or, alternately, a screw thread arrangement. However, other suitable interlocking means may be included, such as spring-biased pins (not shown) internal to each support pole 80, or the like. Accordingly, it is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

These and other changes can be made to the invention in light of the above Detailed Description. While the above description details certain embodiments of the invention and describes the best mode contemplated, no matter how detailed the above appears in text, the invention can be practiced in many ways. Details of the system may vary considerably in its implementation details, while still being encompassed by the invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A collapsible utility cart for holding working materials including a five-gallon bucket, comprising:
   a base having a plurality of legs extending downwardly therefrom, each leg having a rolling means at a distal end thereof, an upper side of the base including an interlocking means;
   a bucket holder having a peripheral wall extending upwardly around a perimeter thereof, the bucket holder adapted to retain the five-gallon bucket therein;
   a plurality of support poles each having the interlocking means at each end thereof, any two of the support poles capable of being locked together by their respective interlocking means;
   a foldable handle adapted to interlock with the interlocking means of the top-most support pole; and
   a plurality of nestable, generally planar shelves each having a central aperture therein and a retaining lip extending upwardly at least partially around a perimeter thereof, and wherein each support pole is adapted to capture at least one of the shelves thereon when the utility cart is in an extended configuration, and wherein each shelf nests with the other shelves on the one support pole when the utility cart is in a collapsed configuration;
   whereby the bucket holder and each support pole may be added to the base to achieve the extended configuration of the utility cart, and whereby all but one of the support poles may be removed from the base, the handle fixed to the top end of the one support pole to achieve the collapsed configuration of the utility cart.

2. The collapsible utility cart of claim 1 wherein each rolling means is a caster.

3. The collapsible utility cart of claim 1 wherein the interlocking means is at least one locking pin traversing aligned pin apertures of interlocking support poles, the base including one support pole fixed thereto and projecting upwardly therefrom.

4. The collapsible utility cart of claim 1 wherein the interlocking means is a screw thread.

5. The collapsible utility cart of claim 1 further including a light pole and wherein the bucket holder further includes a light pole mounting means adapted to secure a bottom end of the light pole thereto.

6. The collapsible utility cart of claim 1 wherein the uppermost shelf is adapted to retain each of the support poles therein when the utility cart is in the collapsed configuration.

7. The collapsible utility cart of claim 5 wherein the light pole further includes and extending means, whereby the light pole may be selectively set at a desired height.

* * * * *